Patented Mar. 16, 1943

2,313,719

UNITED STATES PATENT OFFICE 2,313,719

MANUFACTURE OF ORGANIC SULPHITATION PRODUCTS

Leland James Beckham, Geddes, N. Y., assignor to The Solvay Process Company, New York, N. Y., a corporation of New York No Drawing. Application January 19, 1942, Serial No. 427,327

11 Claims. (Cl. 260—513)

This invention relates to the manufacture of organic sulphonate products and is particularly concerned with a novel method for the preparation of surface-active products of especial value as detergents, wetting agents, dispersing agents, emulsifying agents, and the like.

In my United States Patent 2,265,993 there is described the manufacture of organic sulphonate products by forming addition productse of nitrosyl halides with unsaturated aliphatic compounds or mixtures thereof and reacting the addition products with alkali sulphite so as to replace the halogen atoms with sulphonate radicals. Such products will be referred to hereinafter as nitrosation-sulphitation products.

My application Serial No. 424,940 of December 30, 1941, entitled "Derivatives of unsaturated compounds and method of making" relates to the manufacture of nitrosation-sulphitation products from carboxylic-substituted unsaturated hydrocarbons and mixtures thereof.

In accordance with the present invention I have found that valuable surface-active products of the type described above may be prepared by sulphitation of nitrogen trioxide or tetroxide addition products of organic compounds containing a non-aromatic C=C linkage.

The nitrogen trioxide or tetroxide addition products may be prepared by nitrosation of the selected unsaturated organic compound in accordance with the general procedures described in my prior applications, substituting nitrogen trioxide or tetroxide for nitrosyl chloride. However, the reaction using nitrogen oxides proceeds relatively rapidly and hence, under otherwise like reaction conditions, a shorter reaction period is necessary than required for nitrosation with nitrosyl chloride. The immediate products of nitrosation prepared with nitrogen tetroxide are believed to be nitroso-nitrates and those prepared with nitrogen trioxide, nitroso-nitrites. However, this difference in structure is relatively unimportant as far as the production of sulphitation products is concerned since in both cases sulphitation is easily effected. Mixtures of nitric oxide and nitrogen tetroxide in proportions corresponding to nitrogen trioxide are believed to react in the same way as the trioxide. If excess nitrogen tetroxide is present, it behaves as such; if excess nitric oxide is present, it behaves as an inert diluent.

For use in the process of the present invention organic compounds containing non-aromatic C=C linkages, particularly olefins and their carboxylic derivatives such as unsaturated acids and their esters, salts, amides, and chlorides, and unsaturated acid nitriles, constitute suitable starting materials. For the manufacture of products destined for use as detergents, wetting agents, emulsifying agents, and the like, compounds containing between 10 and 30 carbon atoms per ethylenic group, at least 8 of which are disposed as a continuous carbon chain, are preferred as the organic starting materials.

Of the olefins, the mono-olefins containing between 12 and 23 carbon atoms are especially suitable for the manufacture of cleansing agents, the olefins at the lower end of this range excelling in wetting and foaming power, those near the middle excelling as low temperature washing agents, and those at the higher end excelling as washing agents for relatively high temperature washing. However, there are no rigidly fixed boundaries between the materials suitable for wetting agents and those suitable for detergents, and the molecular structure may influence the properties of the products one way or another to shift the boundary between those materials most effective as detergents and those most effective as wetting agents. Moreover, the presence of materials most suitable as wetting and foaming agents in a product intended primarily for cleansing may have substantial advantages in accelerating wetting, and holding soil, thus expediting cleansing operations.

The olefinic compounds may be straight chain compounds or secondary or tertiary branched chain compounds, and may contain one or more especially one or two double bonds per molecule. The double bonds may be located in a terminal position or in an intermediate position. Compounds most valuable for detergent purposes may be obtained from olefins and carboxylic-substituted olefins containing an olefinic linkage at the end of a carbon chain of at least 8 carbon atoms.

The source of the olefinic compound may be animal, vegetable, or mineral. Thus suitable olefins may be prepared by dehydrating alcohols obtained by hydrogenation of naturally occurring fats and oils, such as tallow, palm oil, cocoanut oil, olive oil, or the corresponding free acids, or the olefins may be prepared by the Fischer-Tropsch synthesis or by cracking waxes or by cracking or dehydrogenating natural or synthetic (Fischer-Tropsch) petroleum or petroleum fractions or by halogenating and dehydrohalogenating such materials or by polymerizing low molecular weight olefins.

Olefinic mixtures containing olefins and saturated hydrocarbons derived from natural or synthetic (Fischer-Tropsch) petroleum immediately or by thermolytic treatments constitute highly satisfactory initial materials for use in accordance with the present invention. Thermolytic treatments which have been found to yield large proportions of the desired olefins are catalytic and non-catalytic cracking, catalytic dehydrogenation, and combinations thereof. The preferred olefinic mixtures, comprising for the most part hydrocarbons containing between 10 and 30 carbon atoms per molecule, may be segregated from less desirable products of the treatment by fractional distillation. Since paraffinic, aromatic, or saturated alicyclic hydrocarbons or other relatively inert diluent liquids, especially liquids which are solvents for the olefin or olefins being reacted, may be present during formation of the nitrogen oxide adducts, non-olefinic hydrocarbons present in such thermolytic-processed petroleum distillate fractions may be permitted to remain and may be separated after the sulphitation treatment as water-insoluble oils. The petroleum may be fractionaly distilled prior to the thermolytic treatment, to provide an oil containing an increased proportion of the hydrocarbons containing 10 and more carbon atoms per molecule. Saturated aromatic constituents, to the extent they are acted upon by the nitrogen oxides, form active products which may be converted by alkali sulphite and bisulphite to water-soluble surface-active products. Since such materials may contribute substantially to the yield of valuable detergent products, the process of the invention is particularly advantageous for treating olefinic mixtures containing saturated aromatic constituents such as alkyl benzenes.

Examples of suitable olefins are cetene (derived from spermaceti and comprising for the most part cetene-1), 2-methyl-pentadecene-2, dodecene-1, pentadecene-7, tricosene-11, nondecene-9, 10-methyl nondecene-9, and olefin-containing $C_{16}$–$C_{23}$ mixtures obtained by cracking topped, crude, natural or synthetic petroleum or by dehydrogenating a petroleum distillate, such as gas oil or by reacting carbon monoxide and hydrogen in the presence of a catalyst such as cobalt (the Fischer-Tropsch synthesis). Some synthetic petroleums contain relatively high proportions of olefins as compared with natural petroleum and hence are more suitable for use without a concentration or thermolysis to increase the olefin content.

Suitable substituted olefins are esters of unsaturated fatty acids such as acrylic acid and oleic acid, mono- and di-esters of maleic acid or mixtures such as the alkenyl succinic acid esters obtained by condensation of maleic anhydride with olefin fractions obtained by cracking or dehydrogenating natural or synthetic petroleum or by catalytic processes, such as the Fischer-Tropsch synthesis, and esterification of the unsaturated dicarboxylic acid anhydrides formed, with saturated mono-, di-, or trihydroxy alcohols, such as methanol, ethanol, propanol, isopropanol, the butanols and pentanols, glycol and glycerin and their homologs, lauryl alcohol, myristyl alcohol and cetyl alcohol; the esters of saturated fatty acids, such as acetic, lauric and stearic acids with unsaturated alcohols, such as allyl alcohol and its homologs; the mono-esters and the symmetrical and unsymmetrical di-esters of succinic acid with unsaturated alcohols or with an unsaturated alcohol on the one hand and a saturated alcohol on the other; the free oleic and alkenyl succinic acids and their alkali-metal salts and acid chlorides; the amides of saturated fatty acids and unsaturated amines; the amides of unsaturated fatty acids and amines, e. g. dimethyl amine, methyl butyl amine, ethyl butyl amine, etc.; and unsaturated ketones.

Specific examples of substituted olefins are butyl oleate, oleic acid, methyl oleate, isopropyl oleate, allyl stearate, allyl laurate, di-n-octyl (octinyl, nonenyl, decenyl, or undecenyl) succinate, oleic acid amide, N-methyl oleic acid amide, N-dimethyl oleic acid amide, oleic acid anhydride, oleic acid chloride, oleic acid nitrile, N-allyl lauric acid amide, N-oleyl butyric acid amide, N-methyl N-oleyl propionic acid amide, N-ethyl N-oleyl acetic acid amide, N-methyl N-lauryl 4-hexenoic acid amide, N-decyl 3-pentenoic acid amide, 3-methyl-4-dimethyl-cyclopentane-1-carboxylic acid ester of allyl alcohol, and oleone.

Examples of suitable unsaturated ring compounds are n-lauryl cyclohexene and $\Delta^2$-3-methyl-4-dimethyl-cyclopentene-1-carboxylic acid ester of butanol-1.

The nitrosation may be conducted in the presence or, in the case of liquids, in the absence of inert non-aqueous solvents for the unsaturated organic compound and for the nitrogen oxide. The process may be carried out by introducing the nitrogen oxide either as a gas or as a liquid and at temperatures from below zero, say −20° C., up to 80° C. However, an advantageous method involves introducing the nitrogen oxide into an agitated solution of the unsaturated compound in a suitable organic solvent maintained at a reaction temperature between 0° C. and 25° C. The introduction of nitrogen oxide may be continued until part or substantially all of the non-aromatic C=C bonds have reacted. Normally 1 to 2 mols of nitrogen oxide per C=C group, depending upon the compound treated and the conditions of reaction, will suffice to react with substantially all of the unsaturated organic compound; up to 2 mols of the nitrogen oxide may react, depending upon reaction conditions. In most cases it is desirable to effect relatively complete reaction of the C=C bonds. In some cases it may be preferable to limit nitrosation to a lower degree; for example, in the production of detergents from unsaturated compounds containing more than one non-aromatic C=C linkage and less than 10 carbon atoms per unsaturated linkage, nitrosation may be limited to advantage to restrict the number of unsaturated linkages reacted to provide in the product at least 10 carbon atoms per reacted unsaturated linkage.

The sulphitation of the nitrosation products may be effected by treatment with aqueous alkali sulphite, preferably at a temperature between 60° and 130° C., as described in United States Patent 2,265,993. Suitable sulphites are sodium sulphite, sodium bisulphite, ammonium sulphite, ammonium bisulphite, potassium sulphite, and potassium bisulphite.

The improvements in sulphitation procedure described in my applications Serial Nos. 424,941, 424,942, and 424,943 filed December 30, 1941, are applicable to the manufacture of nitrosation-sulphitation products in accordance with the process of the present invention.

Thus it is of advantage to effect sulphitation of the nitrogen oxide adducts with an aqueous alkali-metal sulphite mixture containing the normal alkali-metal sulphite and alkali-metal bisulphite in a molecular ratio between 1 and 5 and to first mix the adduct with sufficient of the sulphitation reagent to provide 2½ to 5 mols of total sulphite (including bisulphite) for each reacted non-aromatic C=C linkage in the adduct—for each mol of adduct in the case of mono-olefins, and to gradually raise the temperature from an initial sulphitation temperature between 0° and 50° C. to a final sulphitation temperature between 65° and 130° C. at a rate such that 10% to 50% of the sulphitation takes place below 65° C., and to employ in the sulphitation an aqueous medium containing a water-soluble organic solvent, especially an aqueous alcoholic solvent medium containing an alcohol such as isopropyl alcohol, all as described more fully in the aforesaid applications.

The sulphitation products in the form of the free acids or alkali-metal salts constitute surface-active agents of particular value for use with aqueous media. The free acids are readily obtainable from the sodium salts by acidification. Other metal salts and amine salts, such as alkaline-earth metal salts, heavy metal salts, methylamine salts, ethanolamine salts and pyridine salts may be formed by treatment of the free acids with the appropriate bases.

The following examples illustrate the process of the invention:

Example 1

To 1350 parts by weight of an olefinic distillate of 100° C. to 225° C. boiling range at 10 mm. absolute pressure obtained by cracking light amber petrolatum and containing 244 parts by weight of olefins were added 138 parts by weight of liquid $N_2O_4$ at a substantially uniform rate over a one hour period. The reaction mixture was kept at 25° C. throughout the addition and during a subsequent one hour period. A stream of dry air was then blown through the product to expel unreacted $N_2O_4$. The nitrosation product was a greenish brown. The nitrosation product was subjected to sulphitation by reacting it with a sulphitation reagent consisting of 378 parts $Na_2SO_3$, 104 parts $NaHSO_3$, 1260 parts $H_2O$, and 270 parts 2-propanol. Reaction was started at ordinary temperatures, the mixture heated to about 85° C. over a one hour period, and reaction continued at about 85° C. for 24 hours. Agitation was provided throughout the reaction. A yield of detergent was secured corresponding to a conversion of about 86% of the olefinic ingredients of the oil employed. The product was an excellent detergent as indicated by washing tests made on soiled pieces of wool. It was resistant to precipitation by the constituents of hard water. The product also showed wetting, penetrating, foaming, emulsifying, and dispersing properties.

Example 2

Into cetene maintained between 10° and 20° C. twice an equimolecular equivalent of nitrogen tetroxide was passed in a period of three hours. The nitrosation product was subjected to sulphitation as in Example 1. 81 mol per cent of water-soluble sulphitation product were obtained of excellent color and cleansing ability and good lime resistivity.

Example 3

Into a $C_{17-19}$ mineral seal oil containing 5% olefins and maintained between 20° and 30° C. 6.6 mols of nitrogen tetroxide per mole of olefins were introduced in a two hour gassing period. The liquid nitrosation product was decanted off from gummy residue and subjected to sulphitation as in Example 1. 111 mol per cent of water-soluble sulphitation product were obtained of good cleansing ability, very good color, and excellent lime resistivity.

The yield of greater than 100% in this example is attributed to formation of aromatic detergents by nitration of high-boiling aromatic constituents of the mineral seal oil, probably alkyl or cycloalkyl benzenes, and sulphite reduction of the aromatic nitro compounds to aromatic sulphonates, sulphamates and/or sulphonate sulphamates.

Example 4

Into a $C_{13-23}$ distillate oil (containing 13.8% olefins averaging 17.4 carbon atoms per molecule and obtained by dehydrogenating a petroleum gas oil) maintained at 25° C. 1½ mols of $N_2O_4$ were introduced per mole of olefins during a 1½ hour gassing period. The liquid nitrosation product was separated from gummy residue by decantation and subjected to sulphitation as in Example 1 except that sulphitation was conducted at temperatures between 25° and 40° C. 49 mol per cent of a water-soluble sulphitation product of good cleansing ability and lime resistivity were obtained.

Example 5

To 1350 parts by weight of an olefinic distillate of 100° C. to 225° C. boiling range at 10 mm. absolute pressure obtained by cracking light amber petrolatum and containing 244 parts by weight of olefins, were added 152 parts of a gas prepared by mixing 60 parts NO with 92 parts $N_2O_4$. The gas was introduced over a two hour period during which the reaction temperature was kept at 25°. A stream of dry air was then blown through the nitrosation product to expel residual nitrogen oxides. The green nitrosation product was converted to detergent by stirring 24 hours at 85° with 378 parts $Na_2SO_3$, 104 parts $NaHSO_3$, 1260 parts $H_2O$, and 270 parts 2-propanol. Detergent salt was secured in high yield based on the olefin constituents of the oil employed. The product was tested and found to have very good cleansing, wetting, and foaming properties.

Example 6

Into cetene maintained between 30° and 35° C. an equimolecular amount of a mixture of nitrogen tetroxide and nitric oxide in proportions corresponding to nitrogen trioxide was passed in a period of one hour. The nitrosation product was subjected to sulphitation as in Example 5. 79 mol per cent of water-soluble sulphitation product were obtained of excellent color and cleansing ability.

Example 7

Into an olefinic distillate oil of the type employed in Example 4 maintained at 0° C. 2 mols of liquid $N_2O_3$ are gradually introduced per mol of olefins in the oil in a two hour nitrosation period. The liquid nitrosation product after separation of gum is subjected to sulphitation as in Example 5. A water-soluble sulphonate of good cleansing ability is obtained.

I claim:
1. The process which comprises reacting the addition product of an organic compound containing at least one non-aromatic C=C linkage and an oxide of the group consisting of nitrogen trioxide and nitrogen tetroxide with an alkali sulphite.
2. The method of making a surface-active organic sulphonate product which comprises re- acting at a temperature between 60° and 130° C. the addition product of an oxide of the group consisting of nitrogen trioxide and nitrogen tetroxide, and an organic compound containing at least one non-aromatic C=C linkage and between 10 and 30 carbon atoms per non-aromatic C=C linkage, with an aqueous alkali sulphite.

3. The method of making a surface-active organic sulphonate product which comprises reacting at a temperature between 60° and 130° C. the addition product of a nitrogen tetroxide and an organic compound containing at least one non-aromatic C=C linkage and between 10 and 30 carbon atoms per non-aromatic C=C linkage, with an aqueous alkali sulphite.

4. The method of making a surface-active organic sulphonate from an organic compound containing at least one non-aromatic C=C linkage and between 10 and 30 carbon atoms per non-aromatic C=C linkage, which comprises reacting said compound at a temperature below 80° C. with an oxide of the group consisting of nitrogen trioxide and nitrogen tetroxide to form a reactive organic nitrosation product and subjecting said reactive organic nitrosation product of sulphitation.

5. The method of making a surface-active organic sulphonate from an organic compound containing at least one non-aromatic C=C linkage and between 10 and 30 carbon atoms per non-aromatic C=C linkage, which comprises reacting said compound at a temperature below 80° C. with an oxide of the group consisting of nitrogen trioxide and nitrogen tetroxide to form a reactive organic nitrosation product and reacting the reactive organic nitrosation product with aqueous alkali sulphite at a temperature between 60° and 130° C.

6. The method of making a surface-active organic sulphonate product from an organic compound containing from 1 to 2 non-aromatic C=C linkages and between 10 and 30 carbon atoms per non-aromatic C=C linkage, which comprises reacting said compound at a temperature below 80° C. with nitrogen tetroxide to form a reactive organic nitrosation product and subjecting the reactive organic nitrosation product to sulphitation by means of aqueous alkali sulphite to convert it to a surface-active organic sulphonate product.

7. The method of making a surface-active organic sulphonate product from a mono-olefin containing between 10 and 30 carbon atoms, which comprises reacting said mono-olefin at a temperature below 80° C. with nitrogen tetroxide to form a reactive organic nitrosation product and subjecting the reactive organic nitrosation product to sulphitation by means of aqueous alkali sulphite to convert it to a surface-active organic sulphonate product.

8. The method of making a surface-active organic sulphonate product from an olefinic oil containing mono-olefins and non-olefinic hydrocarbons comprising between 12 and 23 carbon atoms to the molecule and obtained by thermolytic treatment of petroleum hydrocarbons, which comprises treating said olefinic oil with nitrogen textroxide at a temperature below 80° C. to convert said mono-olefins to reactive organic nitrosation products and subjecting the reaction product to sulphitation to convert reactive organic nitrosation products to surface-active organic sulphonate products.

9. The method of making a surface-active organic sulphonate product from an olefinic oil containing mono-olefins and non-olefinic hydrocarbons, including alkyl aromatic hydrocarbons, comprising between 12 and 23 carbon atoms to the molecule and obtained by thermolytic treatment of petroleum hydrocarbons, which comprises treating said olefinic oil with an oxide of the group consisting of nitrogen trioxide and nitrogen tetroxide at a temperature below 80° C. to convert said mono-olefins to reactive organic nitrosation products and subjecting the reaction product to sulphitation to convert reactive organic nitrosation products to surface-active organic sulphonate products.

10. The method of making a surface-active organic sulphonate product from an olefinic oil containing mono-olefins and non-olefinic hydrocarbons, including alkyl aromatic hydrocarbons, comprising between 12 and 23 carbon atoms to the molecule and obtained by thermolytic treatment of petroleum hydrocarbons, which comprises treating said olefinic oil with nitrogen tetroxide at a temperature below 80° C. to convert said mono-olefins to reactive organic nitrosation products and subjecting the reaction product to sulphitation to convert reactive organic nitrosation products to surface-active organic sulphonate products.

11. The method of making a surface-active organic sulphonate product from an organic compound containing from 1 to 2 non-aromatic C=C linkages and between 10 and 30 carbon atoms per non-aromatic C=C linkage at least 8 of said carbon atoms being disposed as a continuous carbon chain, which method comprises reacting said compound at a temperature below 80° C. with an oxide of the group consisting of nitrogen trioxide and nitrogen tetroxide to form reactive organic nitrosation products and reacting the reactive organic nitrosation products with an aqueous alcoholic sulphitation reagent comprising a mixture of normal alkali-metal sulphite and alkali-metal bisulphite in a molecular ratio between 1 and 5, at a sulphitation temperature rising gradually from an initial sulphitation temperature between 0° C. and 50° C. to a final sulphitation temperature between 65° C. and 130° C.

LELAND JAMES BECKHAM